(12) United States Patent
Bellar

(10) Patent No.: US 7,595,081 B1
(45) Date of Patent: Sep. 29, 2009

(54) NON-FLOUR CONTAINING BAKED AND RELATED FOOD COMPOSITIONS

(76) Inventor: Willis F. Bellar, 3339 Town & Country La., St. Charles, MO (US) 63301

( * ) Notice: Subject to any disclaimer, the term of this patent is extended or adjusted under 35 U.S.C. 154(b) by 602 days.

(21) Appl. No.: 10/967,549

(22) Filed: Oct. 18, 2004

Related U.S. Application Data

(60) Provisional application No. 60/512,306, filed on Oct. 17, 2003.

(51) Int. Cl.
*A23J 1/00* (2006.01)
(52) U.S. Cl. .................. 426/656; 426/634; 426/614; 426/391; 426/549; 426/552; 426/553; 426/558
(58) Field of Classification Search .............. 426/634, 426/391, 549, 552, 553, 558, 656, 614
See application file for complete search history.

(56) References Cited

U.S. PATENT DOCUMENTS

| | | | | |
|---|---|---|---|---|
| 3,930,055 A * | 12/1975 | Engelman et al. | ........... | 426/644 |
| 3,962,335 A * | 6/1976 | Kumar | ........... | 426/574 |
| 4,042,714 A | 8/1977 | Torres | ........... | 426/62 |
| 5,591,471 A * | 1/1997 | Niwano et al. | ........... | 426/440 |
| 5,776,887 A | 7/1998 | Wibert et al. | ........... | 514/2 |
| 5,780,091 A * | 7/1998 | Cassetta et al. | ........... | 426/557 |
| 6,093,426 A * | 7/2000 | Tai et al. | ........... | 426/94 |
| 6,261,625 B1 * | 7/2001 | Pickford | ........... | 426/576 |
| 6,479,089 B2 * | 11/2002 | Cohen | ........... | 426/550 |
| 6,558,731 B1 | 5/2003 | del Valle | ........... | 426/656 |
| 7,182,968 B2 * | 2/2007 | Gare | ........... | 426/548 |
| 2001/0055642 A1 * | 12/2001 | Cohen | ........... | 426/550 |
| 2002/0164402 A1 | 11/2002 | Kazemzadeh | ........... | 426/72 |
| 2003/0091698 A1 * | 5/2003 | Marsland | ........... | 426/94 |
| 2003/0134023 A1 | 7/2003 | Anfinsen | ........... | 426/549 |
| 2003/0143287 A1 | 7/2003 | Bell | ........... | 424/655 |

FOREIGN PATENT DOCUMENTS

WO WO 0119195 * 3/2001

* cited by examiner

*Primary Examiner*—Anthony Weier
(74) *Attorney, Agent, or Firm*—Grace J. Fishel

(57) ABSTRACT

Non-flour containing baked and related food compositions are made with egg protein and soy protein isolate stabilized with a hydrocolloid component. Fats and oils may be added without collapsing the matrix of egg protein and soy protein isolate. The food compositions may be used by cellacs and are sufficiently low in net carbohydrates as to be useful in diet programs requiring a low level of carbohydrates for weight loss.

6 Claims, No Drawings

NON-FLOUR CONTAINING BAKED AND RELATED FOOD COMPOSITIONS

This application claims priority from U.S. provisional patent application 60/512,306, filed Oct. 17, 2003.

BACKGROUND OF THE INVENTION

1. Field of the Invention

The present invention relates to non-flour containing baked and related food compositions and to a method of making them. More specifically, it is related to low-carbohydrate, non-flour containing foods

2. Brief Description of the Prior Art

Baked and related foods, e.g. waffles, pancakes, cookies, cream puffs, flatbreads, desert pastries, pasta and dumplings, made from wheat and other food grade flours have been consumed by humans since ancient times. These foods contain high levels of digestible carbohydrates among other nutrients, that provide calories for body energy. When more calories are consumed than needed for energy, the nutrients are converted to fat and may result in obesity. Excess body weight results in low self-esteem and has been shown to contribute to a myriad of health problems.

Professional nutritionists and health specialists have developed various diet and exercise programs with varying degrees of success. One program that is effective in the opinion of the inventor is the Atkins diet. During the first two weeks of the Atkins diet, almost no carbohydrates are consumed. The diet induces a state of ketosis. Ketosis occurs when the body, which is deprived of carbohydrates, starts to burn fat for energy. After the two-week induction period, carbohydrates are gradually added back into the diet, but must still be kept at a low level for weight loss. Weight maintenance and blood sugar levels can be maintained by controlling daily carbohydrate consumption.

There are recipes for baked deserts and bread type products in low carbohydrate Cook books such as *Dr. Adkins Cook Book*; but many of the products are either too high in carbohydrates, have a bitter taste from the flour substitutes used and/or lack normal texture and good mouthfeel in the opinion of the inventor.

BRIEF SUMMARY TO THE INVENTION

In view of the above, it is an object of the present invention to provide a replacement for flours such as wheat, corn, oats, rice, potato, spelt, soy, tapioca, rye and barley flour in baked goods and related products. It is another object to provide products that are low enough in carbohydrates to be consumed in a satisfying quantity by a person on a reduced carbohydrate diet. It is also an object to provide baked foods and related products that are free of gluten and attractive to cellacs, people with celiac disease. Other objects and features of the invention will be in part apparent and in part pointed out hereinafter.

In accordance with the invention a baked food or related product includes a source of egg protein, soy protein, a hydrocolloid component and water. These four ingredients are whipped or mixed together to form a rigid cell structure that sets up during baking or cooking. A selection of numerous other ingredients can be included with the structural forming materials to produce an extensive variety of bakery type products. The addition of fats or vegetable oils does not adversely effect the structure whereas in conventional baking formulas whipped egg albumen will collapse when fats or oils are added.

The invention summarized above comprises the compositions and methods hereinafter described.

DETAILED DESCRIPTION OF THE INVENTION

In traditional food products made with flour and containing eggs, the egg and flour proteins initially support the product structurally while the starch component of the flour is undergoing gelatinization. As baking or cooking proceeds, the egg and flour proteins coagulate and the gelatinized starch becomes the supporting matrix. The present invention is directed to a baked or cooked food product formed without flour having a matrix of egg protein and soy protein stabilized with a hydrocolloid component. The product is formed from a dough or batter. Additional ingredients such as low carbohydrate bulking agents, edible fats or oils, sugar replacements, other proteins, leavening agents, flavors and the like may be added, depending on the food product being made.

As used herein, the essential protein components of the food product are egg protein and soy protein. The egg protein may be provided as whole eggs, egg whites, egg white solids or as combinations thereof. The dough or batter composition generally comprise from about 10 to about 75 weight % of egg protein on a wet basis. The soy protein is a water dispersible soy protein isolate. Soy protein isolates are identified by their manufacturers as having "low", "medium" or "high" viscosity. A mixture of soy protein isolates of varying viscosities may be used to achieve a desired blend of consistency and texture in the finished product. As illustrated in the following examples, good results have been obtained with a mixture of low and high viscosity soy protein isolates. The addition of high viscosity soy proteins strengthen the product and make it chewy while low viscosity soy proteins soften the product and product a short bite. Blends of soy protein isolates are used to achieve a desired texture. The soy protein can comprise from about 5 to about 15 weight % of the dough or batter composition.

The compositions of the present invention may optionally contain other proteins from non-gluten forming protein sources. Dairy proteins may be used such as sodium caseinate, calcium caseinate and whey proteins for improved texture and crust color. Other sources of additional protein include vegetable sources such as pea and bean proteins, hydrolyzed protein and mixtures thereof.

The hydrocolloid component stabilizes the matrix formed by the egg protein and soy protein isolate as the product is baked or cooked. The hydrocolloid component supports the cell structure of the product and serves as an emulsifier and whipping agent. Suitable hydrocolloid components include alginates, xanthan gum, locust bean gum, guar gum, agar-agar, carrageenans, pectins, methylcellulose, methylethylcellulose, hydroxypropyl-methylcellulose, gelatin and combinations thereof. Especially preferred are xanthan gum and guar gum because of availability and price. In addition, a combination of xanthan gum and guar gum is synergistic. The two gums together form a much stronger cell structure. The hydrocolloid component is included in the dough or batter composition in an amount sufficient to stabilize the matrix formed by the egg protein and soy protein. In general, the hydrocolloid comprises less than about 4 weight % of the dough or batter composition, preferably less than about 2 weight % of the dough or batter composition.

Bulking agents such as maltodextrin, polydextrose and food grade fibers may be included in the products. Maltodextrin is a glucose polymer produced by the polymerization of corn starch. Corn-based maltodextrin is safe for patients with celiac disease since it does not contain proteins from wheat, barley, oats or rye. Polydextrose is a polymer prepared by the condensation of a melt including glucose, sorbitol and a suitable acid. Polydextrose is just partially metabolizable, containing only about 25% digestible carbohydrate, and releases only about ¼ calorie per gram consumed. Other low calorie carbohydrate bulking agents such as food grade fibers as will occur to the ordinarily skilled artisan may also be used. The dietary fibers may be one or a combination of soy, wheat, oats, rice, flax, bamboo, carob, or other food grade fibers, as well as hydrolyzed forms of the fibers, and combinations thereof. The bulking agents can comprise up to about 15 weight % of the dough or batter composition. When soy fiber is used in combination with maltodextrin and polydextrose, it is preferably present in an amount up to about 5 weight %.

The dough or batter from which the baked or cooked product is formed also comprises a liquid component comprising water. Water is the main vehicle to combine and mix the dry ingredients in order to prepare a homogenous, viscous dough or batter mass. The water is also required to hydrate the protein and hydrocolloid components to develop viscoelastic characteristics required for proper matrix formation in the baked or cooked product. It can be added per se or as a component of other aqueous liquids, such as milk and comprises the balance of the dough or batter after the addition of the non-liquid materials.

The liquid component can also optionally include an edible oil such as vegetable oil. Examples of suitable oils include soybean, corn, canola and sunflower oils. Soybean oil is particularly preferred because it does not contain transfatty acids. In other products, an animal fat such as melted butter may be used. Vegetable oils such as margarine and shortening and animal fats in solid form may also be used with the water to provide a workable dough or batter.

Non-caloric sweeteners may be added to taste, including such common ingredients as the soluble saccharin salts such as sodium and calcium saccharin salts and L-aspartic acid derived sweeteners, such as 1-aspartyl-L-phenylalanine methyl ester, known, for example under the product name ASPARTAME. Other non-caloric sweeteners include Aselflame potassium which like the saccharin salts and L-aspartic acid derived sweeteners tends to leave a bitter aftertaste in baked foods is therefore not recommended. Particularly preferred non-caloric sweeteners are those derived from ordinary sugar, e.g. chlorodeoxysugar, derivatives such as derivatives of chlorodeoxysucrose or chlorodeoxygalactosucrose, known, for example under the product designation of SUCRALOSE. Alcohol sugars may also be used as sweeteners, depending on their classification by the FDA as low carbohydrate foods. Flavorings, condiments, fruits, nuts, cheeses, chocolate, cocoa, etc. may also be added to enhance the organoleptic quality of the food product. Salt is another commonly used and well-known ingredient that can be used in the dough or batter.

The dough or batter composition of the present invention may optionally include chemical leavening agents. Chemicals such as baking powder, tartaric acid and its potassium salt, baking sodas and the like may be used. Carbon dioxide produced by yeast, entrapped air, and vapor pressure have also been used as leavening agents.

The dough or batter composition may optionally include vitamins, minerals and other microingredients. The dough or batter may also include preservatives to improve or extend the shelf life of the product and other such materials well-known to the ordinarily skilled artisan.

The present invention is also directed to processes for preparing the doughs and batters. Doughs are kneaded or mixed to an appropriate consistency for make up. Overmixing of the doughs is not detrimental to baking performance as is the case with conventional doughs made with flour. Batters are whipped to an optimum specific gravity. For example, when the baked or cooked food product is fluffy like a waffle or pancake, the ingredients are whipped at high speed to entrain air and achieve a specific gravity substantially less than 1.0, for example a specific gravity between about 0.2 and about 0.5. Doughs, on the other hand, and other food products such as cookies are formed by mixing the ingredients together at lower speeds.

The dough or batter is then baked or cooked in a usual manner. The term "baked" refers to heating in air such as in an oven or microwave. The term "cooked" includes frying, boiling, steaming, and the like.

The following examples illustrate the invention.

Example 1

A waffle or pancake batter having the following composition was prepared.

| Ingredient | Percent by Weight |
| --- | --- |
| Whole eggs | 35.71 |
| Soy protein 825 | 7.12 |
| Soy protein 981 | 2.37 |
| Calcium caseinate | 2.52 |
| Xanthan gum | 0.50 |
| Guar gum | 0.50 |
| Maltodextrin | 1.04 |
| Polydextrose | 1.04 |
| Soy fiber | 1.47 |
| Sodium aluminum phosphate | 0.47 |
| Bicarbonate of soda | 0.47 |
| Salt | 0.37 |
| Soy oil | 10.71 |
| Water | 35.71 |

The maltodextrin was STA-DRI 100 and polydextrose was STA-LITE III from Tate & Lile of Decatur, Ill. The xanthan gum was NF/FCC, 80 mesh from Archer Daniels Midland (ADM) of Decatur, Ill. The guar gum was 8/22 power 186-1339 from TIC Gums, Inc. of Belcamp, Md. The soy protein isolates 825 and 981 were PRO-FAM 825 and PRO-FAM 981 from ADM. The calcium caseinate was 15406, K056 from Kerry Specialty Ingredients of Beloit, Wis. The soy fiber was FI-1 from The Fibred Group of LaVale, Md.

The ingredients were placed in a bowl and whipped together on speed 6 of a Kitchen Aid mixture (or speed 3 of a Hobart 200 mixer) for 4 minutes to a specific gravity of 0.30 or 68 to 78 g per 1 cup measure. For pancakes or waffles, 32 g portions of the batter were deposited with a No. 10 ice cream scoop on a double plate pancake grill or into each section of a waffle iron brushed or sprayed lightly with soy oil. The pancake grill or waffle iron was set to "high" temperature, closed and locked. The pancakes were baked 3 minutes and the waffles were baked for about 4 to 5 minutes until light golden brown in color. The bake loss was approximately 30 weight % for pancakes and 47 weight % for waffles.

The waffles were cooled on a wire screen or served immediately. The cooled waffles were cut into four sections and stored in plastic bags for refrigerating or freezing. They were reheated and re-crisped by placing them in a toaster oven on light to medium heat. The waffles and pancakes were also reheated in a microwave oven, resulting in soft, hot products.

The net carbohydrate content of three waffle sections or three pancakes made with 100 g of batter was 0.5 g or less.

This was confirmed by the following nutrition data provided by the American Institute of Baking on a 100 g sample of the batter:

| Nutrient | Values | Unit |
| --- | --- | --- |
| Calories | 202.47 | kcal |
| Calories from fat | 132.89 | kcal |
| Total fat | 14.77 | g |
| Saturated fat | 2.93 | g |
| Trans fat | 0.09 | g |
| Polyunsaturated fat | 7.22 | g |
| Monounsaturated fat | 4.05 | g |
| Cholesterol | 152.30 | mg |
| Sodium | 443.66 | mg |
| Potassium | 121.87 | mg |
| Total carbohydrate | 4.54 | g |
| Dietary fiber | 3.06 | g |
| Sugars | 0.51 | g |
| Protein | 14.92 | g |
| Vitamin A | 185.80 | IU |
| Vitamin C | 0.00 | mg |
| Calcium | 92.70 | mg |
| Iron | 2.14 | mg |
| Thiamin | 0.06 | mg |
| Riboflavin | 0.21 | mg |
| Niacin | 0.18 | mg |
| Folate | 39.91 | mcg |
| Moisture | 63.34 | g |
| Ash | 2.34 | g |

The pancakes and waffles made as described above may be used as toast, to make sandwiches, pizza, appetizers, bread pudding, short cake, bread crumbs when dried and crushed, etc. Nuts, cheese, herbs and a variety of flavoring materials were added to the batter. For muffins and other products, a non-caloric sweetener such as SUCRALOSE was added. Cones and cookie wafer sheets were also produced from the pancake and waffle batter.

A suggested hearty breakfast having less than 3.5 g net carbohydrates may be had with the pancakes or waffles formed above and comprises:

| Food | Net Carbohydrates |
| --- | --- |
| Coffee | 0.0 g |
| 3 Waffles sections or pancakes | 1.5 g |
| Butter | 0.0 g |
| 3 to 4 oz Ham or bacon | 1.0 g or less |
| ¼ cup low carbohydrate syrup | 1.0 g or less |
| Total Net Carbohydrates | 3.5 g or less |

Example 2

A dough for dinner rolls, sandwich buns, hot dog buns and bread sticks having the following composition was prepared.

| Ingredient | Grams |
| --- | --- |
| Egg albumen | 460 |
| Egg yolk | 40 |
| Soy protein 981 | 100 |
| Xanthan gum | 11 |
| Guar gum | 19 |
| Maltodextrin | 22 |
| Sodium aluminum phosphate | 5 |
| Sodium bicarbonate | 5 |
| Salt | 2 |
| Soy oil | 100 |
| Water | 460 |

The ingredients were placed in a bowl and whipped on high speed for about 4 minutes. The dough was then placed in a pastry bag and deposited on parchment paper or a non-stick surface and baked at 325° F. for 35 to 60 minutes, depending on size. Underbaked product receded.

In the formula given above, the maltodextrin may be partially replaced with polydextrose. The polydextrose contains 75% less net carbohydrates than maltodextrin, but an excess amount may cause diarrhea in some humans.

Food grade fibers, herbs, cheese, nuts, vegetables and the like were added for variety breads and rolls. Bread sticks were coated with garlic butter and grated parmesan cheese and warmed in an oven.

Example 3

A cream puff shell, eclair shell, snack shell and puffed snacks dry mix having the following composition was prepared.

| Ingredient | Percent by Weight | Grams |
| --- | --- | --- |
| Soy protein 981 or 974 | 38.67 | 137 |
| Calcium caseinate | 8.50 | 30 |
| Guar gum | 8.50 | 30 |
| Xanthan gum | 8.50 | 30 |
| Maltodextrin | 26.85 | 95 |
| Sodium aluminum phosphate | 3.42 | 12 |
| Baking soda | 3.42 | 12 |
| Salt | 2.14 | 8 |

A batter for small shells and puffed snacks was prepared from the dry mix as follows:

| Ingredient | Grams | Amount |
| --- | --- | --- |
| Dry mix | 354 | 3 cups |
| Whole eggs | 720 | 14 large |
| Soy oil | 188 | 1 cup |
| Boiling water | 1400 | 6 cups |

The dry mix was placed in a bowl and the boiling water added gradually while being mixed together. The soy oil was added and mixed at medium speed. The batter was allowed to cool to 140° F. or lower. Mixing on medium speed was continued and the whole eggs added slowly and mixed to achieve a smooth batter.

The dough was placed in a pastry bag and deposited in 14 g strips on parchment paper. The strips were then baked at 450° F. for 15 minutes, after which the oven temperature was lowered to 300° F. and baking continued for about 20 minutes until the shells were baked dry.

The batter described above was also used to make small puffed snacks. The dough was deposited from the pastry bag in drops about the size of large pearls and baked until dry and crisp. The baked product was then coated with powdered cheese or with melted low carbohydrate chocolate. The puffed snacks can also be used plain with soy milk as breakfast cereal.

For thinner shelled products, egg whites may be substituted for part of the whole eggs. All egg whites produced tissue paper thin shells and puffs which crushed easily on handling.

The baked shells and puffs were frozen for future use. When baked to low moisture, 3.5 to 4.0%, they were shelf stable in poly bags for several weeks.

The dry mix was also used for large shells (i.e., 3 to 6 inches long). A batter having the following composition was prepared.

| Ingredient | Grams |
| --- | --- |
| Dry mix | 354 |
| Whole eggs | 880 |
| Soy oil | 188 |
| Boiling water | 1140 |

The mixing and baking method used for the small shells was used for the large shells. Drying times, however, were longer. The shells were filled with flavored low carbohydrate whipped cream, custard, cheese meat, seafood spreads, etc.

Example 4

A whipped egg mixture for two 10-inch cheese cakes having the following composition was prepared.

| Ingredient | Percent by Weight | Grams |
| --- | --- | --- |
| Whole eggs | 4.32 | 170 |
| Egg yolks | 1.65 | 65 |
| Xanthan gum | 0.09 | 3.5 |
| SPLENDA | 0.30 | 11.5 |

SPLENDA is a mixture of maltodextrin and SUCRALOSE.

The above ingredients were whipped together on speed 6 of a Kitchen Aid mixer for 6 to 8 minutes until stiff.

A paste having the following composition was prepared.

| Ingredient | Percent by Weight | Grams |
| --- | --- | --- |
| Soy Protein 981 | 0.28 | 11 |
| Cream cheese | 57.73 | 2270 |
| Guar gum | 0.15 | 6 |
| SPLENDA | 0.28 | 11 |
| CRYSTALLITE lemonade powder | 0.08 | 3 |
| Ground nutmeg | 0.08 | 3 |
| Vanilla | 0.38 | 15 |
| Salt | 0.03 | 1 |
| Whipping cream | 23.09 | 908 |
| Water | 11.54 | 454 |

The whipped egg mixture was added to the paste mixture and mixed until smooth on medium speed. Two 10-inch pans were sprayed with PAM. When spring form pans were used, the bottom and sizes were covered with aluminum foil and the pan baked in a 1-inch deep water bath. The cakes were baked at 350° F. for approximately 1 hour. The oven was turned off and the cakes were left to cool in the oven for 1 to 2 hours. The cakes were then refrigerated before they were served.

Lemon juice and other flavorings were used in place of the CRYSTALLITE lemonade powder for variety.

Example 5

A dry cookie/biscuit mix was developed to facilitate the production of a variety of cookies and savory biscuit snacks. For savory products the sugar substitutes are omitted. The following mix worked best for wire cut or sheeted cookies. For rotary cookies, the leavening agents were reduced by approximately 75%.

A creamed mixture having the following composition was prepared.

| Ingredient | Percent by Weight |
| --- | --- |
| Hydrogenated shortening | 9.57 |
| Mono and diglycerides | 2.42 |
| Lecithin | 2.42 |
| Butter flavor | 0.60 |
| Vanilla | 0.60 |

The mono and diglycerides were BK65 K from American Products of Kansas City, Mo. The butter flavor was from Mother Murphy Laboratory, Inc. (MOTHER MURPHY'S) of Greensboro, N.C.

The following was added to the creamed mixture and blended until a uniform mix was obtained:

| Ingredient | Percent by Weight |
| --- | --- |
| Soy protein Ardex F.D. | 23.87 |
| Calcium caseinate | 2.97 |
| Xanthan gum | 0.66 |
| Guar gum | 0.80 |
| Maltodextrin | 8.66 |
| Polydextrose | 21.15 |
| Soy fiber | 16.52 |
| SUCRALOSE | 0.44 |
| Sodium aluminum phosphate | 4.30 |
| Sodium bicarbonate | 4.30 |
| Salt | 1.11 |

The soy protein Ardex F.D. was from ADM.

A basic cookie dough was made from the above mix.

| Ingredient | Grams |
| --- | --- |
| Cookie mix | 900 |
| Whole eggs | 180 |
| Hydrogenated shortening | 509 |
| Water | 212 |

The shortening was creamed until light and the eggs added. Water was then added to form a firm dough. To simulate a commercially formed wire cut cookie, the dough was passed through a 2-2½ inch cylinder and sliced with a sharp knife as the dough is extruded. The cookies were baked on parchment paper at 350° F. for approximately 15 minutes. For shelf stable cookies, they should be dried to about 3.5% moisture. A 24 g piece of dough yielded a cookie weighing 17 to 18 g when baked.

The net carbohydrate content of 100 g of cookie mix was 10.91 g. This was confirmed by the following nutrition data provided by the American Institute of Baking on a 100 g sample of the batter:

| Nutrient | Values | Unit |
| --- | --- | --- |
| Calories | 298.51 | kcal |
| Calories from fat | 137.94 | kcal |
| Total fat | 15.33 | g |
| Saturated fat | 3.52 | g |
| Trans fat | 3.78 | g |
| Polyunsaturated fat | 2.52 | g |
| Monounsaturated fat | 5.51 | g |
| Cholesterol | 0.09 | mg |
| Sodium | 2207.81 | mg |
| Potassium | 65.49 | mg |
| Total carbohydrate | 46.43 | g |
| Dietary fiber | 35.52 | g |
| Sugars | 1.65 | g |
| Protein | 24.29 | g |
| Vitamin A | 2.20 | IU |
| Vitamin C | 0.03 | mg |
| Calcium | 188.79 | mg |
| Iron | 8.61 | mg |
| Thiamin | 0.04 | mg |
| Riboflavin | 0.02 | mg |
| Niacin | 0.34 | mg |
| Folate | 41.99 | mcg |
| Moisture | 2.48 | g |
| Ash | 11.46 | g |

Other varieties of cookies were made from the basic cookie dough formed above.

Chocolate chip cookies

| Ingredient | Grams |
| --- | --- |
| Basic Cookie Dough | 600 |
| Low carbohydrate chocolate chips | 200 |
| Chocolate flavor | 3.6 |
| Small pecan pieces (optional) | 50 |

The chocolate flavor was Ivory Coast from MOTHER MURPHY'S. Low carbohydrate chocolate chips were from Debelis, a division of Purotos, a Belgian company, and from Kerry Ingredients.

Peanut butter cookies

| Ingredient | Grams |
| --- | --- |
| Basic Cookie Dough | 600 |
| Peanut butter | 100 |
| Small peanut pieces | 50 |
| Peanut butter flavor | 3.5 |

The peanut butter flavor was from MOTHER MURPHY'S.

Ranger Cookies

| Ingredient | Grams |
| --- | --- |
| Basic Cookie Dough | 600 |
| Pecan pieces | 50 |
| Imitation coconut flavor | 1 |
| Soy protein crisp | 40 |
| Medium macaroon coconut | 40 |

The imitation coconut flavor was from MOTHER MURPHY'S. The soy protein crisp was from Nuvex Corporation.

Chinese almond cookies

| Ingredient | Grams |
| --- | --- |
| Basic Cookie Dough | 600 |
| Almond extract | 2 (or to taste) |
| Whole or halved almonds | 33 to 96 pieces |

An egg wash consisting of ½ of a whole egg and ½ cup water was prepared. Each cookie was brushed with the egg wash and an almond was pressed into the center.

Many other varieties of cookies and biscuits were made, such as double chocolate chip, spice, lemon, biscotti, savory cheese, herb and so forth. Brownies and bar cookies have also been made with the cookie mix by addition of cocoa, glycerin and coloring materials.

Example 6

A cheese cracker dough having the following composition was prepared.

| Ingredient | Grams |
| --- | --- |
| Whole eggs | 340 |
| Soy protein 981 | 165 |
| Sodium Caseinate | 10 |
| Xanthan gum | 6 |
| Guar gum | 6 |
| Maltodextrin | 10 |
| Grated mozzarella cheese | 120 |
| Grated sharp cheese | 120 |
| Grated parmesan cheese | 60 |
| Sodium aluminum phosphate | 11 |
| Sodium bicarbonate | 13 |
| Paprika | 5 |
| Ground white pepper | 1 |
| Salt | 5 |
| Soy oil | 100 |

The eggs, xanthan gum and maltodextrin were whipped together for 6 to eight minutes. To this mixture the other ingredients were added and mixed with a paddle or dough hook.

For hand make up, pieces of the dough were sandwiched between two sheets of parchment paper. The top sheet was peeled away and the top face of the cracker brushed with an egg wash. The crackers were baked in a 350° to 400° F. oven until crisp. The crackers may be topped with sesame or other seeds.

The dough for cheese products is similar to the waffle and pancake batter. The major different is in the use of all high viscosity soy protein and large increase in the amount of soy oil used.

Example 7

A pasta dough having the following composition was prepared.

| Ingredient | Grams |
| --- | --- |
| Eggs | 190 |
| Soy protein 981 | 70 |

-continued

| Ingredient | Grams |
| --- | --- |
| Xanthan gum | 3 |
| Guar gum | 4 |
| Maltodextrin | 5 |
| Sodium aluminum phosphate | 3 |
| Sodium bicarbonate | 3 |
| Salt | 2 |
| Soy oil | 20 |

The ingredients were mixed together with a paddle or dough hook until the dough cleared the bowl.

Sheets of dough ⅛ inch thick were formed between parchment sheets or through a pasta machine. The sheeted dough was cut into rectangles for cannelloni or lasagna or into strips for fettuccine or the like. The dough was cooked like conventional fresh pasta.

Example 8

A dumpling dough having the following composition was prepared.

| Ingredient | Grams |
| --- | --- |
| Whole eggs | 166 |
| Soy protein 981 | 70 |
| Xanthan gum | 3 |
| Guar gum | 3 |
| Maltodextrin | 5 |
| Grated mozzarella cheese | 64 |
| Sodium aluminum phosphate | 3 |
| Sodium bicarbonate | 3 |
| Salt | 2 |
| Soy oil | 20 |
| Hot water | 15 |

The hot water was added after the other ingredients were mixed to develop a smooth dough that cleared the bowl. The dough was then formed into ⅛ inch thick sheets between parchment sheets. The sheets were cut into 1½ to 2-inch squares and boiled in stock for 5 to 6 minutes.

Example 9

A wrap or flat bread dry mix having the following composition was prepared.

| Ingredient | Percent by Weight |
| --- | --- |
| Soy protein 981 | 48.0 |
| Calcium caseinate | 16.50 |
| Guar gum | 6.29 |
| Xanthan gum | 6.29 |
| Maltodextrin | 6.29 |
| Polydextrose | 6.29 |
| Sodium aluminum phosphate | 2.87 |
| Sodium bicarbonate | 2.87 |
| Buttermilk flavor | 1.10 |
| Corn flavor | 1.10 |
| Salt | 2.00 |
| NUTRISHIELD | 0.40 |

Corn flavor and dry buttermilk flavor were from MOTHER MURPHY'S. NUTRISHIELD is a mixture of calcium propionate, potassium sorbate and calcium acetate from Nutri-Shield, Inc. of Shawnee Mission, Kans. NUTRISHIELD does not leave a bitter taste after baking like many other mold inhibitors.

A wrap batter was formed with the dry mix produced above.

| Ingredient | Grams |
| --- | --- |
| Dry wrap mix | 167 |
| Whole eggs | 341 |
| Soy oil | 200 |
| Water | 325 |

The batter was whipped for 3 to 6 minutes or to a specific gravity of 0.30 or 75 g batter per 1 cup. A wrap was formed on a two-sided clam grill by baking the batter for approximately one minute. A flat bread is formed on the same type of grill by baking the batter until the bread is dry and crisp. Cone grills were also successfully used.

In view of the above, it will be seen that the several objects of the invention are achieved and other advantageous results attained. As various changes could be made in the above compositions and methods without departing from the scope of the invention, it is intended that all matter contained in the above description shall be interpreted as illustrative and not in a limiting sense.

What is claimed is:

1. A non-flour containing dough or batter composition containing no gluten comprising:
    (a) about 10 to about 75 weight % whole eggs on a wet basis;
    (b) about 5 to about 15 weight % water dispersible soy protein isolate;
    (c) about 0.1 to about 2.0 weight % hydrocolloid; and
    (d) water
whereby said dough or batter forms a supporting matrix when baked or cooked without the addition of flour.

2. The composition of claim 1 further comprising up to about 20 weight % vegetable oil or animal fat in liquid or solid form.

3. The composition of claim 1 further comprising up to about 5 weight % food grade fiber.

4. The composition of claim 3 wherein the food grade fiber is soy fiber.

5. The composition of claim 1 further comprising up to about 15 weight % of a bulking agent selected from the group consisting of polydextrose, maltodextrin, food grade fibers and mixtures thereof.

6. The composition of claim 5 wherein the bulking agent is maltodextrin and soy fiber.

* * * * *

UNITED STATES PATENT AND TRADEMARK OFFICE
CERTIFICATE OF CORRECTION

PATENT NO. : 7,595,081 B1  Page 1 of 1
APPLICATION NO. : 10/967549
DATED : September 29, 2009
INVENTOR(S) : Willis F. Bellar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1077 days.

Signed and Sealed this

Twenty-eighth Day of September, 2010

David J. Kappos
*Director of the United States Patent and Trademark Office*